Figure 1:
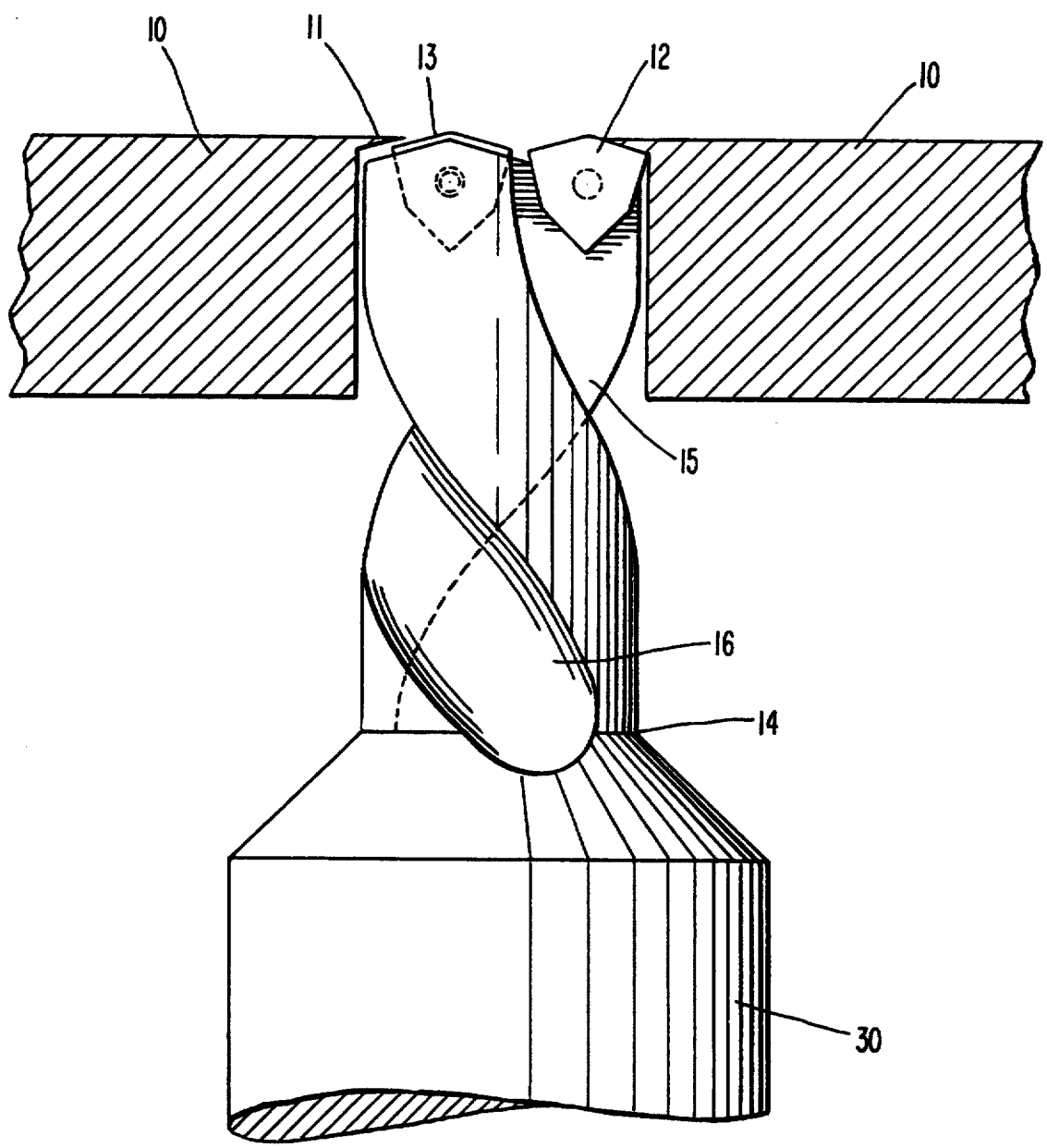

United States Patent [19]

Tukala et al.

[11] Patent Number: 5,429,458
[45] Date of Patent: Jul. 4, 1995

[54] SPIRAL DRILL

[75] Inventors: Tommy Tukala, Sandviken; Leif Karlsson, Karlholmsbruk, both of Sweden

[73] Assignee: Sandvik AB, Sandviken, Sweden

[21] Appl. No.: 202,634

[22] Filed: Feb. 28, 1994

[30] Foreign Application Priority Data

Mar. 3, 1993 [SE] Sweden .................. 9300703

[51] Int. Cl.⁶ .................................. B23B 51/02
[52] U.S. Cl. ........................ 408/223; 408/230
[58] Field of Search ............ 408/223, 224, 227, 713, 408/230

[56] References Cited

U.S. PATENT DOCUMENTS

| | | | |
|---|---|---|---|
| 2,897,695 | 8/1959 | Winslow | 408/223 |
| 4,149,821 | 4/1979 | Faber | 408/199 |
| 4,230,429 | 10/1980 | Eckle | 408/223 |

FOREIGN PATENT DOCUMENTS

| | | | |
|---|---|---|---|
| 3325149 | 1/1985 | Germany | 408/227 |
| 3939291 | 5/1991 | Germany | 408/226 |

Primary Examiner—Daniel W. Howell
Attorney, Agent, or Firm—Burns, Doane, Swecker & Mathis

[57] ABSTRACT

Spiral drill comprising a cylindrical part with two chip grooves (15,16) and a principal maximum stiffness direction (22,23), an attachment part (30) with larger diameter connecting to the cylindrical part at a transition (14), and a tip with indexable cutting inserts (12,13), the chip grooves spirally encircling the cylindrical part to make the principal direction turn an angle C which is at least 110 degrees and at most 125 degrees.

3 Claims, 2 Drawing Sheets

5,429,458

SPIRAL DRILL

BACKGROUND

Drills with indexable cutting inserts, comprising one center insert and one peripheral insert, are previously known from the patent U.S. Pat. No. 4,149,821 and others, and from this it is known that suitable choice of cutting angles and the location of the inserts relative to each other will make it possible to balance the cutting forces so that there is no radial force component when all inserts are cutting.

When this type of drill is used for drilling of through holes, the center insert will cease cutting when the peripheral insert is still machining the last part of the hole wall. The cutting force on the peripheral insert will then no more be balanced, and since it usually has an inward radial component, the drill may be deflected inwards and the diameter of the last part of the hole be diminished. This is especially notable for drills with wide chip grooves, since their bending stiffness is low in the direction of the grooves.

It has been suggested in the patent DE 35 45 586, which concerns a drill where there is a large radial force component even with both inserts cutting, that the depth of the chip grooves should become smaller and the pitch angle steeper with increasing distance from the tip. This would increase the bending stiffness as the bending moment increases. It was also suggested that each chip groove should circle preferably 250–270 degrees of the drill, which would ensure that the bending moment when both inserts are cutting would tend to bend the drill in its stiffest direction both at the end of the grooves and at a midway point where the groove depth is still great. This does not, however, indicate that the deflection at the end of a through hole is minimized or has a specified direction.

The present invention concerns an improved drill with indexable cutting inserts, comprising one center insert and one peripheral insert, where the improvement consists in giving the chip grooves a spiral shape circling the drill for such an angle that the cutting force on the peripheral insert will cause a minimal radial deflection, allowing somewhat larger tangential deflection.

DESCRIPTION OF THE INVENTION

As long as the center insert and the peripheral insert both are cutting, the cutting forces of a drill according to the invention can be balanced with no resulting force but a resultant torque. This has been achieved by locating the inserts in different planes and with different angles relative to the drill axis. When only the peripheral insert is cutting, the cutting force will in addition to axial and tangential components have a radial component due to the inclination of the edge. The drill is designed to be deflected as little as possible by this radial component.

Each cross-section of the drill at any distance from the tip has two principal directions of inertia, one with maximum and one with minimum bending stiffness. Calculations and experiments have shown that if the principal directions vary from the tip of the drill to the end of the chip grooves in a prescribed manner which is a simple function of the angles between the tangent plane at the corner of the peripheral insert, the cutting force and the maximum stiffness direction at the tip, there will be a surprisingly great reduction in radial deflection of the drill when only the peripheral insert is cutting. The deflection will be only a few percent of what it would have been if the chip grooves were straight.

Figure 2:
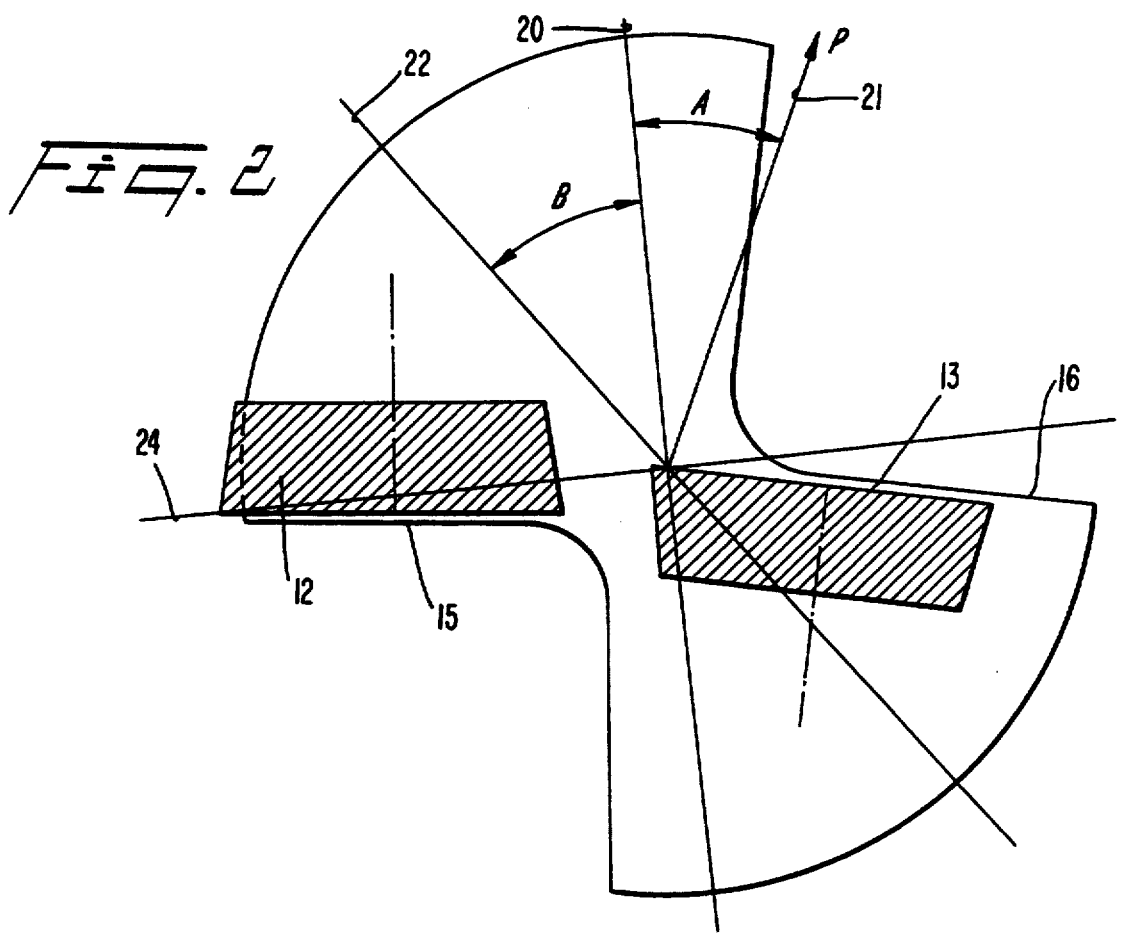
Figure 3:
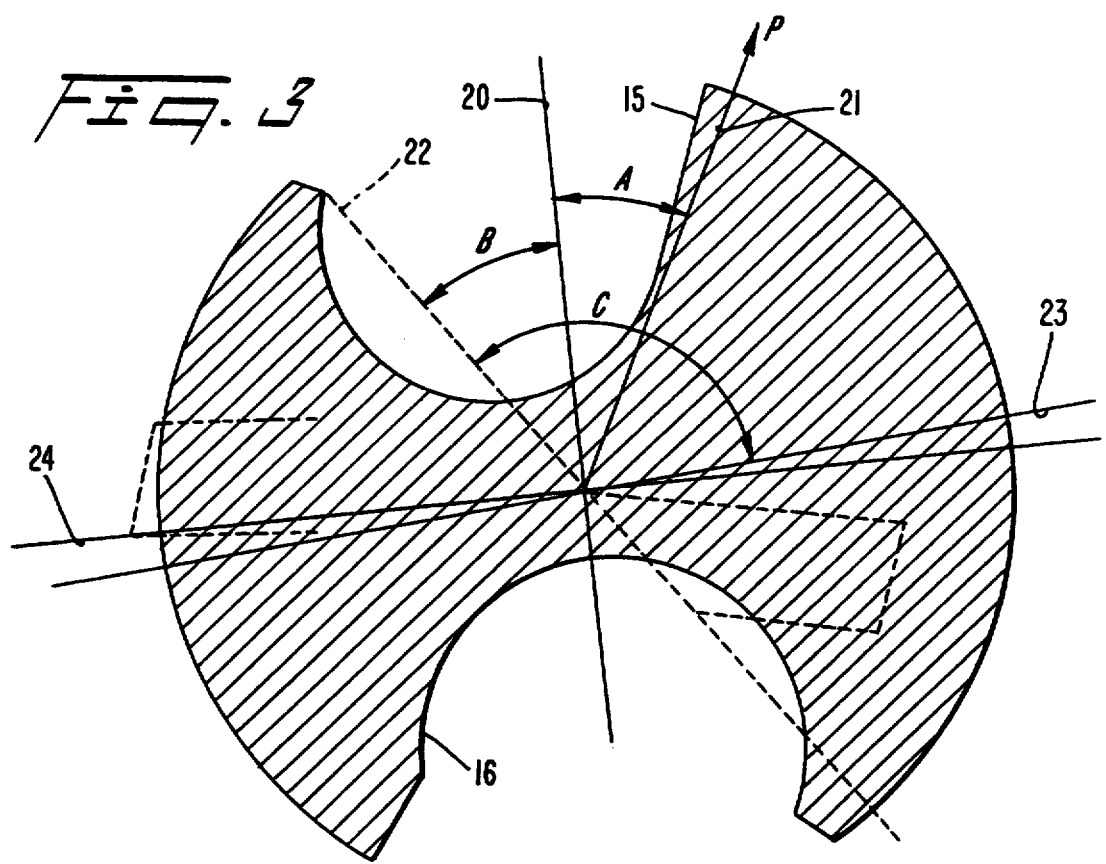

FIG. 1 shows a side view of a drill with a workpiece which has been almost drilled through, FIG. 2 shows the drill seen from the tip end, and FIG. 3 a cross-section at that distance from the tip where the grooves end and the drill diameter increases to make the rest of the drill very stiff.

The drill shown in FIG. 1 has a tip with one peripheral insert (12) and one center insert (13), a cylindrical part with spiral chip grooves (15,16) and an attachment part (30) with large diameter, designed for secure attachment to a drilling machine. The diameter decreases from the attachment part (30) to the cylindrical part in a tapering zone which connects to the cylindrical part at a transition section (14).

When the drill shown in FIG. 1 has almost completed a hole through a workpiece (10), the center insert (13) has ceased cutting, while the peripheral insert (12) is still machining a lip (11) extending into the hole. Even if the cutting forces on the inserts (12,13) had previously balanced each other when both inserts were cutting, there is a large unbalanced force P on the peripheral insert (12) in a direction (21) shown in FIGS. 2 and 3 which show the tip and a cross-section at the transition (14) between the cylindrical and tapering parts. The force P will cause a bending deflection of the cylindrical part, but the tapering and attachment parts (30) are stiff enough to suffer negligible deflection. To avoid any change in diameter of the hole, any component of displacement in a radial plane (24) through the outer corner of the peripheral insert (12) should be as small as possible. Displacement in a tangential direction (20) normal to that radial plane (24) has little influence on the hole diameter and can be tolerated.

A drill with wide chip grooves (15,16) has a great stiffness difference in different directions, with greatest stiffness in a principal direction (22,23) which does not traverse the grooves (15,16), and smallest stiffness in a direction at right angles to that. A drill according to the invention has spirally curved chip grooves, and the principal direction will also gradually turn from a first angular position (22) at the drill tip, to a second angular position at the transition (14). The chip grooves (15,16) need not be equal or have constant section, but should preferably be made with constant pitch angle for easy manufacture.

The angle A between the force P (21) and the tangent direction (20) is determined by the cutting angles of the peripheral insert (12), and the angle B between the principal direction (22) at the tip and the tangent direction (20) is determined by the need for sufficient material thickness for secure attachment of the inserts. By choosing the angle C between the principal direction (22) at the tip and the principal direction (23) at the transition (14) the deflection of the drill can be influenced. The angle C giving the smallest displacement of the peripheral insert in the radial direction (24) can be expressed as a simple function of the angles A and B. If the chip grooves continue from the tip to the transition section (14) with constant pitch angle, and the smallest and largest bending stiffness values are constant along the cylindrical part of the drill, the optimal value of the angle C is expressed as:

$$C = 0.6\,A + 1.2\,B + 57 \text{ degrees}$$

This expression is valid independently of the length of the drill and independently of the ratio between smallest and largest bending stiffness. For typical values of the angles such as $A=21$ degrees and $B=42$ degrees we get the optimum $C=120$ degrees.

For values of C calculated with this expression the radial displacement shows a well defined minimum, especially if the chip grooves are so wide that the ratio between smallest and largest bending stiffness is less than 20 percent, and the radial displacement can in any case be reduced to less than 10 percent of the displacement of a drill with corresponding straight chip grooves. A certain variation of the angle A may occur depending on the state of wear of the insert, leading to 5 degrees change in C. It may also be desired to make the chip grooves somewhat straighter closest to the tip, decreasing the C value another 5 degrees. This can be expressed as a requirement that $(C - 0.6\,A - 1.2\,B)$ should be at least 47 degrees and at most 62 degrees. For normal cutting edges the turning angle C of the chip grooves should be at least 110 degrees and at most 125 degrees.

We claim:

1. Spiral drill comprising a cylindrical part with two chip grooves and a principal maximum stiffness direction, an attachment part with larger diameter connecting to the cylindrical part at a transition section, and a tip with indexable cutting inserts, one of which is a peripheral insert and one a center insert, the chip grooves spirally encircling the cylindrical part from the tip to the transition and making the principal direction turn an angle C from an angular position at the tip to an angular position at the transition, the turning angle C being at least $0.6\,A + 1.2\,B + 47$ degrees, where A is the angle between the tangential direction at the corner of the peripheral insert and the direction of the resultant cutting force P on the peripheral insert as seen from the tip, and where B is the angle between the tangential direction and the principal bending stiffness direction at the tip.

2. Spiral drill comprising a cylindrical part with two chip grooves and a principal maximum stiffness direction, an attachment part with a larger diameter connecting to the cylindrical part at a transition section, and a tip with indexable cutting inserts, one of the inserts being a peripheral insert and one being a center insert, the chip grooves spirally encircling the cylindrical part from the tip to the transition and making the principal direction turn an angle C from an angular position at the tip to an angular position at the transition, where the turning angle C is 110 degrees to 125 degrees.

3. The spiral drill of claim 1, wherein the turning angle C is no greater than $0.6\,A + 1.2\,B + 62$ degrees.

* * * * *